United States Patent [19]
Hofler et al.

[11] Patent Number: 5,369,485
[45] Date of Patent: Nov. 29, 1994

[54] FIBER OPTIC ACCELEROMETER WITH CENTRALLY SUPPORTED FLEXURAL DISK

[75] Inventors: Thomas J. Hofler, Carmel, Calif.; David A. Brown, Barrington, R.I.; Steven L. Garrett, Carmel, Calif.

[73] Assignee: The United States of America as represented by the Secretary of the Navy, Washington, D.C.

[21] Appl. No.: 163,789

[22] Filed: Dec. 9, 1993

Related U.S. Application Data

[62] Division of Ser. No. 651,856, Feb. 7, 1991, Pat. No. 5,317,929.

[51] Int. Cl.⁵ .............................................. G01B 9/02
[52] U.S. Cl. ............................. 356/345; 250/227.19; 73/517 R
[58] Field of Search ................ 356/345; 250/227.14, 250/227.16, 227.18, 227.19, 227.27; 73/517 R, 653, 657; 367/141, 149

[56] References Cited

U.S. PATENT DOCUMENTS

| | | | |
|---|---|---|---|
| 3,011,147 | 11/1961 | Genesley | 73/517 R |
| 3,020,505 | 2/1962 | Bourns et al. | 73/517 R |
| 4,322,829 | 3/1982 | Davis, Jr. et al. | 73/653 |
| 4,363,114 | 12/1982 | Bucaro et al. | 73/657 |
| 4,376,390 | 3/1983 | Rines | 73/653 |
| 4,534,222 | 8/1985 | Finch et al. | 73/653 |
| 4,829,821 | 5/1989 | Carome | 73/516 L |
| 4,893,930 | 1/1990 | Garrett et al. | 356/345 |
| 4,959,539 | 9/1990 | Hofler et al. | 250/227.19 |
| 4,972,713 | 11/1990 | Iwata | 73/517 R |
| 5,063,782 | 11/1991 | Kellet | 73/517 R |
| 5,152,181 | 10/1992 | Lew | 73/861.02 |
| 5,253,222 | 10/1993 | Danver et al. | 356/345 |
| 5,285,424 | 2/1994 | Meyer | 356/345 |
| 5,287,332 | 2/1994 | Lea | 356/345 |
| 5,317,929 | 6/1994 | Brown et al. | 73/517 R |

OTHER PUBLICATIONS

D. A. Brown, T. Hofler, and S. L. Garrett; "Fiber Optic Flexural Disk Microphone"; Proceedings of SPIE, vol. 985, 6-7 Sep. 1988, pp. 172-182; Society of Photo-Optical Instrumentation Engineers; Bellingham, Wash.

D. A. Brown, T. Hofler, and S. L. Garrett; "High-Sensitivity, Fiber Optic, *Flexural Disk Hydrophone with Reduced Accelleration Response*" *Fiber and Integrated Optics*; vol. 8, pp. 169-191, 1989.

ENDEVCO General Catalog; ENDEVCO, San Juan Capistrano, Calif.; 1986 pages captioned "Vibration Applications and Theory" and Optimization of S/N Ratio.

*Primary Examiner*—Samuel A. Turner
*Assistant Examiner*—Russell C. Wolfe
*Attorney, Agent, or Firm*—Stephen J. Church; Melvin J. Sliwka; John L. Forrest, Jr.

[57] ABSTRACT

An accelerometer or seismometer has an elastic disk bearing a mass distributed peripherally around the disk. The disk is supported for flexure and for isolation from mounting strain by a stob centrally through the disk. The accelerometer or seismometer has a pair of flat spirals of optical fiber, each spiral being fixedly attached to a corresponding disk side so that disk flexure lengthens a spiral on one disk side and shortens a spiral on an oppositely facing disk side and so that temperature differences between the spirals are minimized. The pair of spirals are connected as legs of a fiber optic interferometer so that the interferometer provides an output corresponding to the flexure. Several of the disks and asociated pairs of spirals may be coaxially mounted to provide increased sensitivity.

11 Claims, 2 Drawing Sheets

FIBER OPTIC ACCELEROMETER WITH CENTRALLY SUPPORTED FLEXURAL DISK

CROSS-REFERENCE TO RELATED APPLICATION

This application is a division of application Ser. No. 7/651,856 filed Feb. 7, 1991, now U.S. Pat. No. 5,317,929 issued Jun. 7, 1994.

BACKGROUND OF THE INVENTION

1. Field of the Invention

This invention relates to measuring acceleration and vibration using optical measurement by light interference.

2. Description of the Related Art

The flexure or strain of an elastic disk is a well-known basis for measurements including acceleration and pressure, acceleration typically being measured by such flexure resulting from momentum forces acting on such a disk in a direction along its axis. The amount of flexure may be determined interferometrically, mechanically, piezoelectrically, or by changes in capacitance or resistance of elements associated with the disk. However, all strain measuring devices have various deficiencies such as limited sensitivity, high cost, limited maximum deflection, and errors due to operating conditions. Some errors due to operating conditions may be fundamental, such as the flexure of a disk due to acceleration being indistinguishable from flexure due to pressure differential. Other operating condition errors are caused by changes in dimensions, modulus of elasticity, index of refraction, and the like caused by temperature and pressure.

Interferometric measurements of strain can provide great resolution and, when carried out with an optical fiber, provide a simple and rugged sensor which requires low power, is immune to electromagnetic interference, and is adapted to remote sensing and to high data rates. Although optical fiber interferometric measurements of acceleration and pressure may be carried out directly with fibers of suitable construction, optical fibers themselves are relatively insensitive per unit length when used directly and are subject to errors due to ambient pressure, tension from acceleration, and the like. Interferometers having a single optical fiber sensing leg are particularly subject to error due to temperature caused variations of the leg length. It is evident that increasing leg length to provide greater sensitivity may proportionately increase errors due to operating conditions.

It is known to minimize operating condition errors by a "push-pull" arrangement of a pair of interferometer optical fiber legs such that a change in a measured variable shortens one leg and lengthens the other leg while both legs change length together with undesired variations due to temperature, pressure, or acceleration. However to be effective, interferometric rejection of such common mode errors requires that both legs be subject to exactly the same conditions.

It is also known to increase the sensitivity of fiber optic acceleration and pressure measurements by using the fibers indirectly, as by arranging an optical fiber wound element for strain due to the displacement or deformation of a primary force measuring element. For example, U.S. Pat. No. 4,893,930 discloses a mass supported between pairs of resilient, cylindrical mandrels each wound with an optical fiber which is one leg of an interferometer. In this arrangement, displacement of the mass causes lateral expansion of one mandrel of a pair and contraction of the other thereof so that the fibers of the pair function in the above-described push-pull manner. Such fiber optic arrangements are effective, but may be somewhat limited in sensitivity and have the push-pull optical fiber legs separated spatially and thermally.

High sensitivity and minimal spatial and thermal separation of push-pull fiber optic legs are provided in hydrophones disclosed in U.S. Pat. No. 4,959,539. In these hydrophones, each side of an elastic and circumferentially supported disk is wound with a flat spiral of optical fiber fixedly attached to the disk side. As a result of this construction, flexure of the disk shortens such a spiral on one side of the disk and lengthens such a spiral on an oppositely facing side. Such a disk may be mounted on a body so that an acoustic pressure differential to be measured exists across the disk, the spirals then being connected for push-pull operation as two legs of a fiber optic interferometer to provide an output corresponding to the flexure while substantially canceling errors due to pressure and temperature effects common to the legs. In one such hydrophone, a pair of the circumferentially supported disks and associated optical fiber spirals are mounted on opposite ends of such a body with the outer spirals connected as one interferometer leg and the inner spirals as another leg so that differences in the lengths of the legs due to acceleration induced flexure of the disks are canceled. This double disk arrangement also has twice the sensitivity of the single disk arrangement. Even greater sensitivity would be desirable if the cancellation of common mode errors is not decreased.

SUMMARY OF THE INVENTION

An object of the present invention is to provide, for acceleration and other movement related parameters, a sensor which has great sensitivity and yet has minimal errors due to temperature and to acoustic and static pressure.

Another object is to provide such a sensor which utilizes a fiber optic interferometer having a pair of legs in a push-pull arrangement to provide sensitivity and minimize errors while providing convenient connection to remote interferometric sources and detectors.

Still another object is is to provide such a sensor which is isolated from mounting stress.

A further object is to provide such a sensor which is rugged, easily constructed, and fully effective for measurements under a variety of conditions.

These and other objects and advantages are provided by an accelerometer, or other sensor of the present invention, wherein an elastic disk and a predetermined mass are supported by a body for flexure of the disk due to acceleration, shock, vibration and displacement of the body in a direction axially of the disk. Such a disk, or a plurality of such disks, are wound with a pair of flat spirals of optical fiber, each spiral being fixedly attached to a corresponding disk side so that disk flexure lengthens a spiral on one disk side and shortens a spiral on another disk side. In the present invention, such spirals on oppositely facing disk sides are connected as opposite legs of a fiber optical interferometer so that the interferometer provides an output corresponding to the amplitude of the flexure. A push-pull pair of the spirals may be disposed oppositely of a thermally conducting disk to minimize temperature differences between the push-pull spiral pair. An accelerometer or other sensor of the present invention is constructed with a centrally supported disk having the mass distributed around the disk periphery, this construction being advantageous for isolation from mounting stress and for providing a plurality of coaxially mounted disks for increased sensitivity.

BRIEF DESCRIPTION OF THE DRAWINGS

The features of the present invention will be apparent from the following detailed description of the invention when considered in conjunction with the accompanying drawings wherein.

DETAILED DESCRIPTIONS

Figure 1:
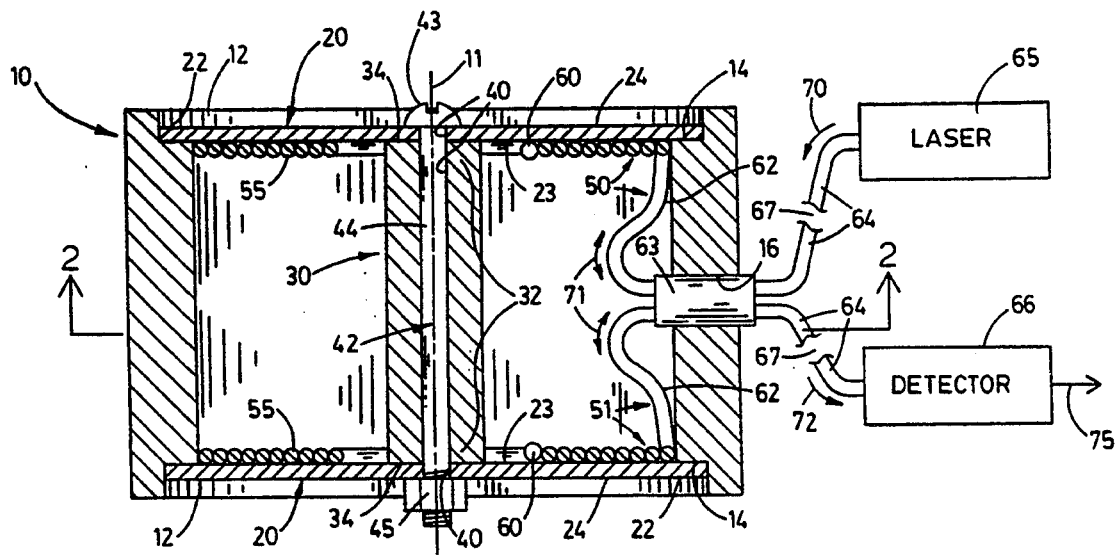
FIG. 1 is an axial section of a fiber optic, flexural disk sensor for measurement of acceleration and other parameters of physical movement. This sensor is depicted with schematically represented interferometer elements, this sensor and the interferometer elements providing information from the above-identified application Ser. No. 07/651,856 and useful in understanding the present invention.
Figure 2:
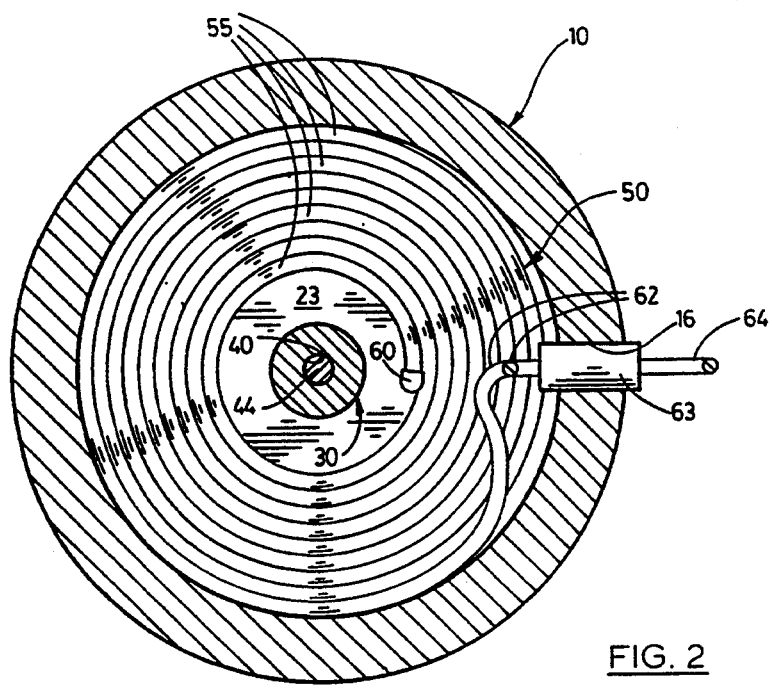
FIG. 2 is a section of the sensor of FIG. 1 taken from the position of line 2—2 thereof.

FIGS. 1 and 2 Sensor

Figure 3:
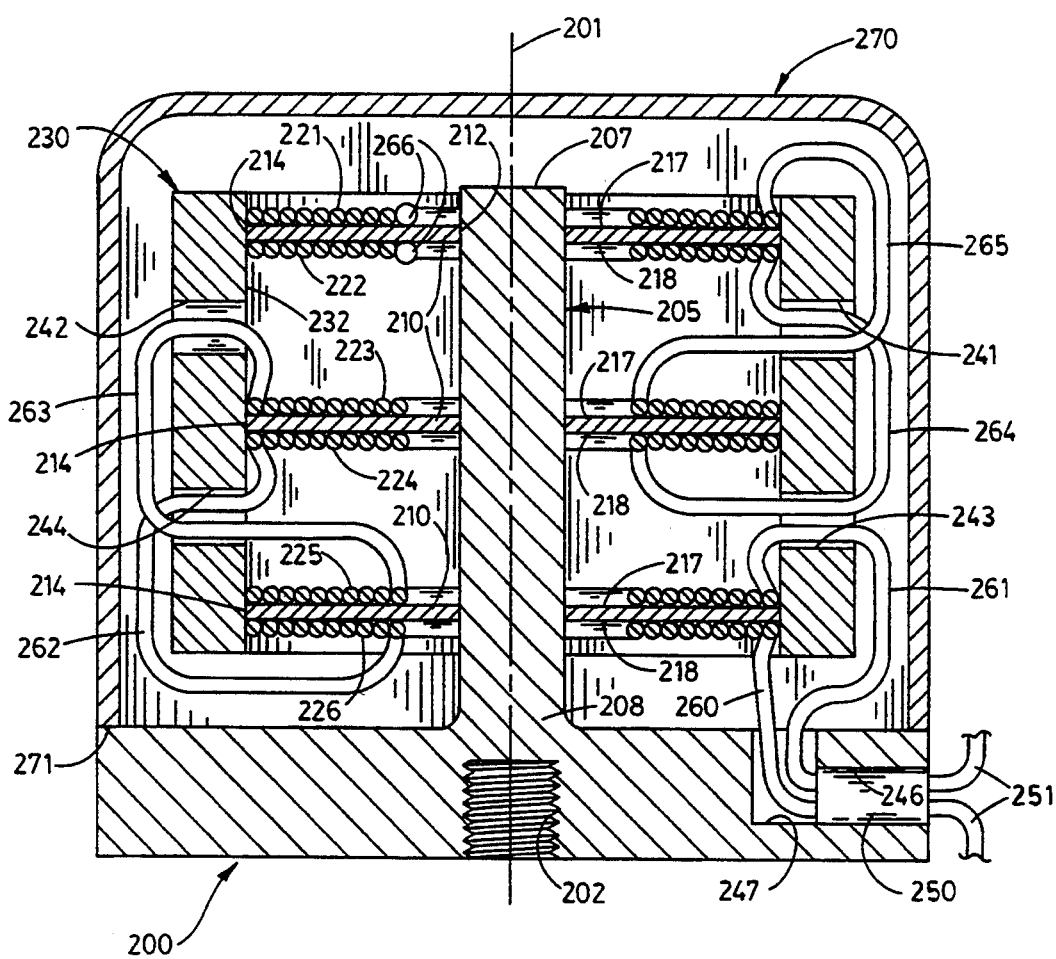
FIG. 3 is a schematic axial section of a fiber optic, flexural disk sensor embodying the principles of the present invention.

FIGS. 1 and 2 show a sensor which is useful in understanding principles of the present invention for measurement of parameters such as acceleration, shock, vibration, and displacement related to physical movement as distinguished from a sensor, such as a microphone or a hydrophone, for sensing pressure or acoustic vibrations in a fluid. This FIGS. 1 and 2 sensor and the embodiment of the present invention shown in FIG. 3 are easily adapted for sensing acceleration so that each of these embodiments may be referred to herein as an "accelerometer", a device subject to and measuring a vibration or movement having a frequency less than the resonant frequency of certain elements of the device subsequently described in detail. However, the resonant frequency of oscillation of these elements may be selected, in a manner apparent to one skilled in the art, so that a sensor of the present invention functions as a seismometer, a device in which vibration or movement to be sensed has a frequency greater than the resonant frequency of oscillation of these elements.

The FIGS. 1 and 2 sensor has a rigid cylindrical body 10 with an axis 11 and axially opposite open end regions 12. Each end region has a counterbore providing an annular, planar surface 14 normal to axis 11 and facing outwardly of the body. Body 10 has a bore 16 disposed axially centrally thereof and extending radially through the body, this bore being fluid sealed as subsequently described.

The FIGS. 1 and 2 sensor has a pair of planar disks 20 disposed normally to axis 11. Each disk has a periphery 22 individually received in the counterbores of regions 12 so that the disks are supported peripherally by body 10 with the disks disposed in coaxial and axially spaced relation. Each disk has an inward side 23 facing axially centrally of body 10 and facing the inward side of the other disk. Each disk has an outward side 24 axially opposite its inward side 23 and facing away from the other disk. Each inward side 23 is flatly and detachably engaged in fluid sealed relation with the corresponding body surface 14. In the background sensor, this relation is provided by elements subsequently described which draw each disk 20 against its surface 14 so that the sensor is immersible in a fluid such as air or water with outward disk sides 24 in contact with the fluid and the interior of the body between inward disk sides 23 isolated from the fluid.

Disks 20 are constructed of any suitable elastic and resilient material so that the disks are axially flexible. As a result, the disks are mounted on body 10 with the disks supported for deflection in a direction axially of the disks and normal to their sides 23 and 24 4.

The FIGS. 1 and 2 sensor has a mass 30 extending between disks 20 and along axis 11 so that this mass is disposed centrally of the disks. Mass 30 is cylindrical and has a pair of axially opposite end portions 32 each bearing a planar surface 34 normal to axis 11 and spaced axially substantially the same distance as body surfaces 14. Surfaces 34 individually, flatly, and detachably engage inward sides 23 of disks 20.

Mass 30 and each disk 20 have a central bore 40 aligned with axis 11. Any suitable fastener, such as a conventional screw assembly 42, is utilized to releasably connect disks 20 to body regions 12 and to mass 30 so that the disks may be separated from body 10 and mass 30 to replace this mass with any one of a plurality of similar masses, not shown but having opposite end portions corresponding to portions 32. Assembly 42 has a unitary head 43 and screwthreaded shank 44 and has a nut 45 screwthreadably engageable with the shank, the shank being extended through aligned bores 40 with head 43 and nut 45 individually bearing against outward disk sides 24 so that appropriate rotation of nut 45 on shank 44 results in mass 30 being fixedly and directly mounted on and resiliently and elastically supported by disks 20 and results in the disks being drawn toward each other and body 10 and into the above mentioned fluid sealed relation with the body.

The sensor of FIGS. 1 and 2 has an optical fiber 50, which is depicted as being associated with the upper one of the disks 20 shown in FIG. 1, and has an optical fiber 51, which is depicted as being associated with the lower one of these disks. Each fiber 50 and 51 is wound with a flat spiral or spiral portion 55 which is fixedly connected, as by any suitable adhesive, along the length of the spiral to the inward side 23 of the disk with the spiral being wound on and substantially concentrically with this disk side. The spirals 55 are fixedly connected or bonded in any suitable manner to the corresponding disk side 23 so that each spiral undergoes the same strain as that side of the disk. A spiral 55 on a disk side which flexes so as to be generally convex thus increases in length. However, a spiral 55 on a side which flexes so as to be generally concave decreases in length. Preferably, spirals 55 are of substantially equal length and are wound with adjacent turns touching. For illustrative convenience, the diameter of the fiber forming spirals 55 depicted as relatively larger in relation to the dimensions of disks 20 than is typically the case.

A sensor having the depicted configuration of disks 20 and spirals 55 is simple to construct and provides relatively high sensitivity and substantial freedom from common mode errors. However, the present invention includes variations such as the use of a flexural element which is not circular or which is axially bowed when there is no pressure differential. Other such variations include an optical fiber spiral conforming to such a noncircular or bowed element, the use of a single optical fiber spiral, and the use of such a spiral which has spaced turns, turns alternating with turns of another spiral, or multiple optical fiber spirals disposed in layers.

Each spiral 55 terminates at its inner turn in a cleaved and thus reflective end which is depicted in FIGS. 1 and 2 as being covered by a cap 60 since the reflectivity of the cleaved end may be adversely affected by the adhesive used to affix the spiral to disk 20. Each fiber 50 and 51 has an extension 62 from the outer turn of the corresponding spiral 55 to one end of a 3 dB coupler 63. This coupler is conveniently received in fluid sealed relation in bore 16. As shown in FIG. 1, a pair of leads 64 of optical fiber extend from the other end of the coupler individually to a laser 65 and to a detector 66. As conventionally indicated by breaks 67, leads 64 may be relatively long so that laser 65 and detector 66 may be remote from the balance of a sensor of the present invention. Spirals 55 are thus connected as legs of a Michelson interferometer which is preferred in the practice of the present invention because of its sensitivity and need for only one connection to each spiral 55 to other forms of interferometer.

However, the present invention may be practiced with optical fiber spirals, which are similar to spirals 55, utilized in a Mach-Zehnder, Sagnac, Fabry-Perot or other interferometer.

Such interferometric use of optical fibers is well-known and will be only briefly described. Light indicated by arrow 70 is transmitted from laser 65 to coupler 63. As indicated by double headed arrows 71, this light is transmitted via the coupler to the spiral fiber ends with caps 60 and is reflected back to the coupler and combined thereat to generate light having variations in intensity due to interference fringes corresponding to variations of the relative length of the spiral of fiber 50 and the spiral of fiber 51 caused by axial flexing of disks 20. The varying light due to these fringes is transmitted to detector 66 as indicated by arrow 72. Detector 66 converts such light variations to corresponding variations in an electrical signal 75 for any suitable display, demodulation, or other use.

In the FIGS. 1 and 2 sensor which is constructed as an accelerometer and undergoes acceleration in a upward direction along axis 11 or which is constructed as a seismometer and has body 10 displaced in this direction, momentum of mass 30 induces axial deflection of the centers of both disks 20 in the opposite direction. The term "momentum" is used in the present application to describe the tendency of a mass such as mass 30 to continue in motion or to remain at rest. Since the spirals 55 of fibers 50 and 51 are disposed on the axially oppositely facing inward sides 23 of these disks, such acceleration results in fiber 50 lengthening as the corresponding disk side becomes convex and results in fiber 51 shortening as the corresponding disk side becomes concave. The interferometer legs formed by fibers 50 and 51 thus change in length in opposite directions so that the interferometer formed by these fibers, coupler 63, laser 65, and detector 66 sums the interferometric effects of such acceleration and of such displacement.

In the FIGS. 1 and 2 sensor, one of the disks 20 is deflected as described above by the momentum of a mass, such as mass 30, supported by the disk. When such deflection occurs, the elasticity of the disk tends to restore the disk to its undeflected configuration so that the disk and mass are a mass-spring system having the above mentioned resonant frequency of oscillation. This frequency is predetermined by the relative values of the elasticity and the mass and is selectable by one skilled in the art by changing the mass and by changing the elastic properties of the disk as determined by its dimensions, material, and mode of support. These elastic properties also include the stiffness of the disk as determined by the diameter of the mass surface 34 engaged with the disk.

Whether a sensor, such as that of FIGS. 1 and 2 or the sensor shown in FIG. 8 and embodying the present invention, is effective as an accelerometer or seismometer depends on the resonant frequency of the disk-mass system relative to the frequency of acceleration or displacement vibrations to which the sensor is subjected. Desired resonant frequencies may be predetermined by constructing the mass of materials having different densities, by varying the volume of the mass, and by varying the stiffness of disks, such as disks 20 by changing their thickness or the area of surface 34.

FIG. 3 Sensor

FIG. 3 shows a sensor which is an embodiment of the present invention for measurement of parameters such as acceleration, shock, vibration, and displacement related to physical movement. The FIG. 3 sensor has a circular base 200 having an axis 201. The base has, at one axial side thereof, a screwthreaded bore 202 extending into the base along axis 201 for mounting the sensor on an object, not shown, for measurement, in a direction along the axis, of such parameters related to the object. The sensor has a cylindrical post or stob 205 extending concentrically from the base and along axis 201 oppositely of bore 202. Stob 205 has a distal end 207 and has an axially opposite proximal end 208 spaced along axis 201 from the distal end. The stob is depicted as having its proximal end joined to the base so that the base and the stob are unitarily constructed. It is evident that base 200 and bore 202 serve to mount stob 205 on such an object for movement therewith along axis 201.

The FIG. 3 sensor has three substantially identical elastic and axially flexible disks 210 which are coaxially related to stob 205 and are spaced axially along the stob between its ends 207 and 208. Disks 210 are similar to disks 20 of the FIGS. 1 and 2 background sensor; however, each disk 210 has a central bore 212 which is fixed in any suitable manner to the exterior of stob 205 so that the FIG. 3 sensor is characterized by the stob extending centrally through each disk 210 with the disk fixedly connected to the stob and centrally supported thereby. Each disk 210 has a periphery 214 and has a pair of axially opposite sides 217 and 218, sides 217 facing distal end 207 and sides 218 facing proximal end 208.

The FIG. 3 sensor has six flat spirals 221–226 of optical fiber. Each of these spirals is similar to one of the spirals 55 as shown in FIGS. 1 and 2 and is, similarly, fixedly and concentrically mounted on one disk side 217 or 218. The length of a spiral 221–226 thus increases when the corresponding disk 210 flexes convexly at the disk side bearing the spiral and the length of the spiral decreases when the disk flexes concavely at this disk side. Spiral 221 is disposed on side 217 of the disk 210 farthest from base 200, and spiral 222 is disposed on side 218 of this farthest disk. Spiral 223 is disposed on side 217 of the disk axially centrally of stob 205, and spiral 224 is disposed on side 218 of this central disk. Spiral 225 is disposed on side 217 of the disk 210 nearest base 200, and spiral 226 is disposed on side 218 of this nearest disk.

The FIG. 3 sensor is further characterized by having a hollow cylindrical mass 230 coaxially related to and circumscribing stob 205 and disks 210. Mass 230 is somewhat shorter axially than stob 205 and has an interior surface 232 fitted to the disk peripheries 214. Surface 231 is fixed to these peripheries in any suitable manner so that mass 230 is supported by the disks and so that momentum of the mass urges the disks to flex axially during acceleration and displacement of an object in a direction along axis 201 when the sensor is mounted on the object by base 200.

In a sensor such as that of FIG. 3 in which mass 230 is disposed peripherally of disks 210, it is apparent that base 200 and stob 205 may be considered as a body for supporting disks 210 with the stob being a portion of this body which extends axially of the disks. It is also apparent that the base and the bore 202 therein, which mount the stob on an object for which the above-identified parameters are to be measured, are connected to the stob only at its proximal end 208 so that the stob and the disks are isolated from strains in the base and in such an object.

It is evident that, when disks 210 of the FIG. 3 sensor are flexed axially by movement of mass 230 toward proximal end 208, disk sides 217 will assume a convex configuration, dome-like configuration, so that spirals 221, 223, and 225 lengthen while sides 218 will assume a concave configuration so that spirals 222, 224, and 226 shorten. Conversely when disks 210 are flexed axially by movement of mass 230 toward distal end 207, disk sides 218 will assume a convex configuration lengthening spirals 222, 224, and 226 while sides 217 assume a concave configuration so that spirals 221, 223, and 225 shorten. It will be apparent that one skilled in the art may select, as described above, the size of mass 230 and the elasticity of disks 210 in relation to the frequency of the parameters to be measured by the sensor so that the sensor will function as an accelerometer or as a seismometer.

Mass 230 has four bores 241-244 extending through it radially. Bores 241 and 242 are disposed diametrically oppositely of the mass between the one of the disks 210 farthest from proximal end 208 and the axially central one of the disks, and bores 243 and 244 are disposed diametrically oppositely of the mass between this axially central one of the disks and the one of the disks nearest proximal end 208. Base 200 has a cavity consisting of a bore 246 extending radially into the base and continuous with a bore 247 which opens axially through the base from the inner end of bore 246 toward the one of the disks 210 nearest proximal end 208.

The sensor of FIG. 3 has a coupler 250 which is received in bore 246 and which is similar to coupler 63 shown in FIG. 1. Coupler 250 has a pair of optical fibers 251 extending from it at an end disposed radially outwardly of base 200, fibers 251 corresponding to optical fibers 64 and serving to connect coupler 250 to a laser and to a detector, not shown but similar to laser 65 and detector 66 of FIG. 1.

In the FIG. 3 sensor, the spirals 226, 224, and 222 on disk sides 218 are connected in series and to the end of coupler 250 opposite fibers 251 as one interferometer leg, and the spirals 225, 223, 221 on disk sides 217 are connected in series and to this coupler end as another interferometer leg. As a result, an interferometer having these legs and having a laser and a detector connected as described above to coupler 250 is adapted to provide a signal corresponding to the acceleration and displacement of an object on which the sensor is mounted as this acceleration and displacement is manifested in the above-described axial flexing of disks 210.

The necessary connections between coupler 250 and spirals 221-226 are made in any suitable manner, as by lengths 260-265 of optical fiber. Length 260 extends through bore 247 and interconnects the end of coupler 250 opposite fibers 251 to the outer turn of spiral 226; length 261 extends through bores 247 and 243 and interconnects this coupler end to the outer turn of spiral 225; length 262 extends through bore 244 and interconnects the inner turn of spiral 226 to the outer turn of spiral 224; length 263 extends through bores 244 and 242 and interconnects the inner turn of spiral 225 to the outer turn of spiral 223; length 264 extends through bore 243 and 241 and interconnects the inner turn of spiral 224 to the outer turn of spiral 222; and length 265 extends through bore 241 and interconnects the inner turn of spiral 223 to the outer turn of spiral 221, spirals 221 and 222 having central terminations provided with caps 266 and corresponding to the optical fiber terminations provided with caps 60 in FIGS. 1 and 2.

The FIG. 3 sensor is provided with a cup-like, rigid case 270 mounted at its periphery in fluid sealed relation to the periphery of base 200 so that the case isolates stob 205, disks 210, and spirals 221-226 with their associated optical fiber interconnections from environmental effects, particularly changes in static or acoustic pressure. The FIG. 3 sensor minimizes common mode temperature effects by having pairs of the spirals, which are in opposite interferometer legs, mounted on each of the disks 210 so that the pair of spirals on each disk are at substantially the same temperature, particularly when the disk is constructed of material which is a relatively good conductor of heat. The sensor of FIG. 3 is advantageous in being highly sensitive because of the relatively great length of optical fiber provided in the push-pull interferometer legs formed by spirals 221, 223, and 225 and by spirals 222, 224, 226. Common mode temperature effects may be further reduced by constructing stob 205 of a low thermal conductivity material thereby reducing the thermal communication between base 200 and disks 210.

In a sensor embodying the principles of the FIG. 3 sensor, the sensitivity may be increased by using more than three disks such as the disks 210 with associated spirals such as spirals 221-226. On the other hand where great sensitivity is not required, a sensor embodying these principles and having the advantages of isolation from mounting stress and environmental effects provided by the FIG. 3 sensor may be constructed with a disk or with two disks each corresponding to one of the disks 210 and having a pair of such spirals of optical fiber.

Obviously many modifications and variations of the present invention are possible in light of the above teachings. It is, therefore, to be understood that the present invention may be practiced within the scope of the following claims other than as specifically described.

What is claimed is:

1. A sensor for a parameter of physical movement, the sensor comprising:
   an elastic disk having opposite sides;
   a mass mounted peripherally on said disk;
   body means centrally supporting said disk so that momentum of said mass induces a deflection of said disk in a direction generally normal to said sides; and an optical fiber having a spiral portion fixedly connected to one side of said disk and wound thereon so that said deflection induces in the fiber a variation in length corresponding to said deflection for interferometric measurement of said variation in length.

2. The sensor of claim 1 wherein said parameter involves acceleration or displacement of said body means and wherein said body means supports said disk so that said acceleration or said displacment induces said deflection.

3. The sensor of claim 1 wherein said optical fiber is one fiber of a pair of optical fibers connectable as legs of an interferometer.

4. The sensor of claim 1 wherein said mass is mounted directly on said disk and wherein said body means supports said disk for deflection in a direction axially of said disk.

5. The sensor of claim 4 wherein said mass is cylindrical and is disposed in circumscribing relation to said disk.

6. The sensor of claim 4 wherein said disk is one disk of a plurality of such disks spaced in coaxial relation along a predetermined axis and wherein said body means comprises a stob extending along said axis and centrally through said disks.

7. The sensor of claim 6 wherein said mass is cylindrical and is disposed in circumscribing relation to said disks.

8. A sensor for a parameter of physical movement related to acceleration and displacement of a predetermined object in a predetermined direction, the sensor comprising:

a plurality of elastic disks spaced in coaxial relation along a predetermined axis, each of said disks being axially flexible and having a pair of axially opposite sides;

a stob extending along said axis and centrally through said disks, said disks being fixedly mounted on said stob;

means for mounting said stob on said object for movement therewith and with said axis extending in said direction;

a plurality of spirals of optical fiber, each spiral being fixedly and concentrically mounted on one of said sides so that the length of the spiral increases when the disk flexes convexly at said side and decreases when the disk flexes concavely at said side;

a cylindrical mass circumscribing said disks and fixed peripherally thereto so that, during said acceleration and displacement, the momentum of said mass causes axial flexing of said disks and lengthening of said spirals mounted on said sides of said disks facing in one direction along said axis and shortening of said spirals mounted on said sides of said disks facing oppositely of said one direction; and interferometer means, which has said spirals mounted on each side of said disks facing in one direction along said axis connected as one interferometer leg and which has said spirals mounted on each side of said disks facing oppositely of said one direction connected as another interferometer leg, for providing a signal corresponding to changes in the lengths of said interferometer legs so that said signal corresponds to said acceleration and displacement.

9. The sensor of claim 8 wherein:

said stob has a pair of opposite ends spaced along said axis; and said mounting means is connected to said stob at only one of said opposite ends so as to isolate said stob and said disks from strains in said mounting means and said object.

10. The sensor of claim 6 wherein said plurality of such disks comprises at least three of said disks.

11. The sensor of claim 8 wherein said plurality of elastic disks comprises at least three of said disks.

* * * * *